United States Patent
Falk et al.

(10) Patent No.: US 10,911,432 B2
(45) Date of Patent: Feb. 2, 2021

(54) USE OF CERTIFICATES USING A POSITIVE LIST

(71) Applicant: Siemens Aktiengesellschaft, Munich (DE)

(72) Inventors: Rainer Falk, Poing (DE); Steffen Fries, Baldham (DE)

(73) Assignee: SIEMENS AKTIENGESELLSCHAFT

(*) Notice: Subject to any disclaimer, the term of this patent is extended or adjusted under 35 U.S.C. 154(b) by 624 days.

(21) Appl. No.: 15/116,035

(22) PCT Filed: Dec. 8, 2014

(86) PCT No.: PCT/EP2014/076868
§ 371 (c)(1),
(2) Date: Aug. 2, 2016

(87) PCT Pub. No.: WO2015/128014
PCT Pub. Date: Sep. 3, 2015

(65) Prior Publication Data
US 2017/0180354 A1    Jun. 22, 2017

(30) Foreign Application Priority Data
Feb. 28, 2014   (DE) .................. 10 2014 203 766

(51) Int. Cl.
*H04L 9/00* (2006.01)
*H04L 29/06* (2006.01)
*H04L 9/32* (2006.01)

(52) U.S. Cl.
CPC ........ *H04L 63/0823* (2013.01); *H04L 9/3268* (2013.01); *H04L 63/0853* (2013.01); *H04L 63/101* (2013.01)

(58) Field of Classification Search
CPC .................................................. H04L 63/0823
(Continued)

(56) References Cited

U.S. PATENT DOCUMENTS

| 6,754,829 | B1 |   | 6/2004 | Butt et al. |
| 7,035,403 | B2 | * | 4/2006 | Jakobsson ............. H04L 9/0894 380/30 |

(Continued)

FOREIGN PATENT DOCUMENTS

| CN | 101616165 A | 12/2009 |
| CN | 102801532 A | 11/2012 |

(Continued)

OTHER PUBLICATIONS

Wikipedia: "Zertifikatsperrliste"; Version vom 7. Juni 2013.

(Continued)

*Primary Examiner* — Christopher J Brown
(74) *Attorney, Agent, or Firm* — Schmeiser, Olsen & Watts LLP (57) ABSTRACT

Methods and apparatuses for using certificates using a positive list are provided. This involves a message, wherein the message includes a certificate for a device, the certificate has a signature for checking an authenticity of the certificate and a piece of admissibility information for ascertaining an admissibility of the certificate using a positive list, being taken as a basis for carrying out authorization for the device subject to the check and the ascertainment. The disclosed can be used in industrial or medical environments.

18 Claims, 4 Drawing Sheets

(58) Field of Classification Search
USPC .......................................................... 726/7
See application file for complete search history.

(56) References Cited

U.S. PATENT DOCUMENTS

| | | | | |
|---|---|---|---|---|
| 7,643,811 | B2* | 1/2010 | Reunamaki | H04B 1/005 455/132 |
| 7,694,135 | B2* | 4/2010 | Rowan | H04L 63/0823 713/162 |
| 8,312,518 | B1* | 11/2012 | Ezell | G06F 21/33 726/4 |
| 9,542,783 | B2* | 1/2017 | Slaby | G06F 21/45 |
| 9,811,399 | B1* | 11/2017 | Bradley | G06F 9/542 |
| 2002/0094090 | A1 | 7/2002 | Iino | |
| 2005/0257260 | A1 | 11/2005 | Lenoir et al. | |
| 2006/0190715 | A1 | 8/2006 | Miller | |
| 2008/0046745 | A1 | 2/2008 | Buch | |
| 2009/0006856 | A1 | 1/2009 | Abraham et al. | |
| 2011/0010543 | A1 | 1/2011 | Schmidt et al. | |
| 2014/0366128 | A1* | 12/2014 | Venkateswaran | H04L 63/08 726/19 |
| 2017/0134173 | A1* | 5/2017 | Kern | H04L 9/3268 |

FOREIGN PATENT DOCUMENTS

| | | |
|---|---|---|
| EP | 0862105 A2 | 9/1998 |
| JP | 2001195373 A | 7/2001 |
| JP | 2006236349 A | 9/2006 |
| JP | 2012520027 A | 8/2012 |

OTHER PUBLICATIONS

Akizuki Yasushi et al: "Realisierung eines Systems zur Erkennung von Kernel-Level-Rootkits unter Verwendung eines Typ-1-Hypervisors"; Technical Report of the Institute of Electronics, Information and Communication Engineers, IEICE; Japan, vol. 110, No. 24, pp. 33-38.; Jun. 5, 2010.
Non-English Chinese Office Action for Application No. 201480076438. 6, dated Sep. 3, 2018.
Fries Steffen et al.: "Securing Telecontrol in Smart Grid Environments"; May 11, 2013; XP055562455; Retrieved from Internet: URL: https://ieeexplore.ieee.org/ielx7/6661631/06661653.pdf?; 2013.
Non-English EP Summons to attend oral proceedings for Application No. 14818901.2, dated Mar. 19, 2019.
Indian Office Action for Application No. 201647022536, dated Nov. 13, 2019.
"Attributzertifikat", http://de.wikipedia.org/wiki/Attributzertifikat, Stand 24. Februar Mar. 3, 2014.
"Using a Whitelist to Verify Certificates", http://etutorials.org/Programming/secure+programming/Chapter+10.+Public+Key+Infrastructure/10.9+Using+a+Whitelist+to+Verify+Certificates, Stand 24. Feb. 2014.
"Digitales Zertifikat", http://de.wikipedia.org/wiki/Digitales_Zertifikat, Stand 24. Feb. 2014.
Cooper D. et al; Internet X.509 Public Key Infrastructure Certificate and Certificate Revocation List (CRL) Profile, RFC 5280; ISSN: 0000-0003; XP015057243; 2008.
International Search Report for PCT Application No. PCT/EP2014/076868, dated Apr. 7, 2015.

* cited by examiner

```
                                                                            VMSG

Certificate                         ::= SEQUENCE {
    tbsCertificate                      TBSCertificate,
    signatureAlgorrithm                 AlgorithmIdentifier,
    signatureValue                      BIT STRING  }

TBSCertificate ::= SEQUENCE
    version                             [0]  Version must be v3,
    serialNumber                        CertificateSerialNumber,
    signature                           AlgorithmIdentifier,
    issuer                              Name,                                    ZERT
    validity                            Validity,
    subject                             Name,
    subjectPublicKeyInfo                SubjectPublicKeyInfo,
    issuerUniqueID                      [1]  IMPLICIT UniqueIdentifier OPTIONAL,
                                        -- If present, version MUST be v2 or v3
    subjectUniqueID                     [2]  IMPLICIT UniqueIdentifier OPTIONAL,
                                        -- If present, version MUST be v2 or v3
    extensions                          [3]  EXPLICIT Extensions  OPTIONAL,
                                        -- If present, version MUST be  v3
    }

Validity ::= SEQUENCE
    notBefore     Time,
    notAfter      Time }

Time ::= CHOICE {
    utcTime       UTCTime,
    generalTime   GeneralizedTime } id-on-CertWhiteList  OBJECT IDENTIFIER ::= { id-on 3 }

CertWhiteList  ::= SEQUENCE {
GI { REF ── target        CertWhiteList, -- reference to whitelist
     ZULA ── issuer       WhiteListIssuer  OPTIONAL                              ZINFO
           identifier ::= CHOICE {    -- specify identifier to be checked
               serialNumber ──── PI1  CertificateSerialNumber,
     APA{      fingerprint_cert      OCTET STRING
               fingerprint_pk  /  -  OCTET STRING
           }        / PI2
           PI3
```

USE OF CERTIFICATES USING A POSITIVE LIST

CROSS-REFERENCE TO RELATED APPLICATIONS

This application claims priority to PCT Application No. PCT/EP2014/076868, having a filing date of Dec. 8, 2014, based off of German application No. DE 102014203766.2 having a filing date of Feb. 28, 2014, the entire contents of which are hereby incorporated by reference.

FIELD OF TECHNOLOGY

The following relates to methods and devices for using certificates by means of a positive list.

BACKGROUND

Malevolent attacks, also known as hacker attacks, of automation systems are increasing significantly in recent times. Therefore, specific digital certificates are used for devices such as production robots or control devices in order to be able to perform an authentication for these devices. This authentication guarantees, for example, that only positively authenticated devices can be operated in the automation system. Similarly, person-related digital certificates can also be used in the industrial environment, for example in order to release a maintenance access for a technician.

According to known documents, "a digital certificate [ . . . ] is a digital data record which confirms particular characteristics of persons or objects and the authenticity and integrity of which can be checked by cryptographic methods. In particular, the digital certificate contains the data required for testing it.

Furthermore, according to known documents, "an attribute certificate [ . . . ] is a digital certificate and constitutes the bond, digitally signed by a trustworthy authority, between certain digital information (attributes) and a further digital certificate thus attributed." The known documents also states that "attribute certificates [ . . . ] are typically a feature of characteristics which either characterize the certificate itself or the person in greater detail.

A further possibility of restricting a validity of digital certificates is known. It is proposed there, as part of an authentication routine, to check the digital certificate against a white list (or certificate white list). The white list, also called positive list, indicates whether the digital certificate to be authenticated may be authenticated by the unit to be authenticated or not. Thus, the authenticating unit can search the positive list for an entry which shows the digital certificate to be authenticated or a reference to it. If the entry is found, an authentication takes place, otherwise, it is stopped.

One disadvantage from is that it is not clear whether an authentication or validity check, also called certificate validation, of a digital certificate takes place on the basis of a positive list or not. On the other hand, the authenticating unit can already perform an authentication of the device on the basis of the present certificate positively without checking the positive list although an additional check of the certificate by means of the positive list would be necessary, for example, because the device may only be operated within a predetermined environment.

SUMMARY

An aspect relates to specifying methods and device which allows an increase in a security when using digital certificates.

Embodiments of the invention relates to a method for generating a message, the message comprising a certificate of a device G and the certificate exhibiting a signature for a check of an authenticity of the certificate, characterized in that an item of permissibility information for determining a permissibility of the certificate by means of a positive list is added to the message.

Embodiments of the invention exhibit the advantage that during an authorization of the device by means of the message, apart from the signature, it is also determined whether the certificate exists on the positive list. By this means, a security in the authorization of the device is increased by the fact that both the checking of the certificate by means of the signature and a determination of the permissibility must be performed. The "compulsion" to perform both the checking and the determination is controlled by the message and is thus not randomly dependent on whether a unit for authorization, apart from the checking of the signature of the certificate, also performs the determination of the certificate by means of the positive list. Thus it is avoided that the authorization is successful if, although the checking of the signature is positive, a determination by means of the positive list is omitted. In addition, the security of the authorization is also increased by the fact that it is obvious to the device with notification of the authorization that both the checking and the determination are performed and are positive.

In one example, the message can have an addressee field, the certificate and the permissibility information. In another example, the message comprises certificate and the permissibility information. In addition, the permissibility information can be arranged separately of the certificate or as part of the certificate in the message. In the latter case, the message can also describe a new certificate.

In a further development, an item of validity information is added to the permissibility information, the validity information having at least one of the following parameters which characterizes the positive list WL to be used in the determination of the permissibility:

permissible issuer of the positive list;
maximum permissible age of the positive list;
application environment parameters AUP of the positive list;
reference REF of the positive list to be used.

Using the permissibility information in this way further increases a security in the authorization of the device because the validity information restricts a number of positive lists which can be utilized for the determination. If necessary, there is no positive list for determination after the restriction so that an authorization fails or only an authorization of the device having a low security level is permitted.

In an advantageous development of embodiments of the invention, a first application information item for performing a first application of the G is added to the permissibility information, wherein the first application information item, in the case of a positive authorization of the device on the basis (i) of a positive check of the authenticity of the signature and (ii) of a positive determination of the permissibility of the certificate by means of the positive list can be applied. By this means, the permissible modes of action, that is to say applications, permissible due to the positive authorization can be allocated to the device. Thus, the security is increased in that the first applications, i.e. first category of at least one application, are allocated to the device in dependence on the authorization.

In an advantageous development of embodiments of the invention, a second application information item for performing a second application of the device is added to the permissibility information, wherein the second application information item can be applied in the case of a positive authorization of the device on the basis (i) of a positive check of the authenticity of the signature and (ii) of a negative determination of the permissibility of the certificate by means of the positive list. Thus, the security is increased by the fact that the second application, i.e. second category of at least one application, is allocated to the device in dependence on the check and the determination, wherein applications of a low security level can be considered as applications of the second category.

In a development of embodiments of the invention, at least one of the following execution parameters is added to the permissibility information, wherein the respective execution parameter describes by means of which characteristic of the certificate the determination can be performed:

serial number of the certificate;
issuer of the certificate;
fingerprint of the certificate;
fingerprint of the public key;
copy of the certificate PI5.

By this means, the security can be enhanced further in the authorizing since the message can inform the unit performing the determination explicitly which of the executive parameters the unit should or may use for carrying out the determination.

Embodiments of the invention also relate to a method for authorizing a device by means of a message, wherein the message can be generated in accordance with one of the steps described before, the device being authorized for applying a first category to at least one application if (a) the checking of the authenticity of the certificate is performed positively, and (b) the determination of the permissibility of the certificate ZERT by means of the positive list is performed positively.

Embodiments of the invention display the advantage that in the authorization of the device by means of the message, apart from the signature, it is also determined whether the certificate is present on the positive list. This increases a security in the authorization of the device by the fact that both the checking of the certificate by means of the signature and also a determination of the permissibility must be performed. The "compulsion" to perform both the checking and the determination is controlled by the message and is thus not coincidentally dependent on whether a unit for authorizing, apart from checking the signature of the certificate, also performs the determination of the certificate by means of the positive list. This prevents the authorization from being successful if, although the checking of the signature is positive, a determination by means of the positive list is omitted. In addition, the security of the authorization is also increased by the fact that the device, on being notified of the authorization, understands that both the checking and the determination are performed and are positive.

Embodiments of the invention also relate to a method for authorizing a device by means of a message, particularly in accordance with the method described before, wherein the message VMSG can be generated in accordance with one of the steps described before, the device being authorized for applying the second category to at least one application if (a) the checking of the authenticity of the certificate is performed positively, and (b) the determination of the permissibility of the certificate by means of the positive list is performed negatively.

In this context, it is advantageous, apart from the advantages described before, that in the case of a negative determination, the authorization does not mandatorily fail but there is also the possibility of performing an authorization with a low security level, i.e. that the device may not perform any security-critical applications or participate in any security-critical applications. Thus, the device can perform, for example, updates but not participate itself in performing a production with other devices.

In an advantageous development, the determination of the permissibility of the certificate is performed at least by means of one of the following executive parameters, the respective execution parameter reproducing a characteristic of the certificate:

serial number of the certificate;
issuer of the certificate;
fingerprint of the certificate;
fingerprint of the public key;
copy of the certificate.

By this means, the security in authorizing can be increased further since the message can explicitly inform the unit performing the determination which of the executive parameters the unit should or may use for carrying out the determination.

In a development of embodiments of the invention, an item of validity information can be evaluated as part of the determination of the permissibility, the validity information exhibiting at least one of the following parameters which characterizes the positive list to be used in the determination of the permissibility:

permissible issuer of the positive list;
maximum permissible age MAXG of the positive list;
application environment parameter (AUP) of the positive list;
reference REF of the positive list to be used.

Using this type of permissibility information further increases a security in authorizing the device because a number of positive lists which can be utilized for the determination is restricted by the validity information. If necessary, there is no positive list available for determination after the restriction so that an authorization fails or only an authorization of the device with a low security level is permitted.

Embodiments of the invention also relate to a message comprising a certificate of a device, wherein the certificate exhibits a signature for a check of an authenticity of the certificate ZERT and an item of permissibility information for determining a permissibility of the certificate by means of a positive list. In addition, the message can be configured in accordance with one of the steps for generating the message.

The advantages of the message can be found in the respective statements shown above for generating the message.

Embodiments of the invention also relate to a first device for generating a message, comprising a first unit for inserting a certificate of a device into the message, the certificate ZERT exhibiting a signature SIG for a check of an authenticity of the certificate, a second unit for adding an item of permissibility information for determining a permissibility of the certificate by means of a positive list.

The second unit can also be designed in such a manner that the permissibility information can be extended in accordance with one of the statements shown for generating the message.

The advantages with respect to the first device are identical with the respective statements, shown above, for generating the message.

In addition, embodiments of the invention also relates to a second device for authorizing a device by means of a message, wherein the message can be generated in accordance with one of the steps described before, comprising a third unit for checking an authenticity of a certificate of the message VMSG, a fourth unit for determining the permissibility of the certificate by means of the positive list, and a fifth unit for authorizing the device for applying a first category K1 to at least one application if the check and the determination are in each case positive.

Furthermore, the fifth unit can be designed for authorizing the device for applying a first category to at least one application if the check is positive and the determination is negative.

Furthermore, the third unit, the fourth unit and the fifth unit can be designed in such a manner that at least one of the developments of the permissibility information can be executed in accordance with a method shown.

The advantages with respect to the respective second device are identical with the respective statements shown above for authorizing the message.

BRIEF DESCRIPTION

Some of the embodiments will be described in detail, with reference to the following figures, wherein like designations denote like members, wherein.

Elements having the same function and mode of operation are provided with the same reference symbols in the figures.

DETAILED DESCRIPTION

In a first exemplary embodiment of the invention, a defective pump is to be interchanged and authorized before being linked into the control communication of the waste water purification plant in an industrial plant for waste water purification. For this purpose, a service technician installs a new pump G instead of the defective pump. After the new pump, also called device G in that text which follows, has been connected to the power system, it generates a message VMSG, the message VMSG comprising a certificate of the pump G, see FIGS. 1 and 2. The certificate ZERT, in turn, has at least one signature SIG wherein, using the signature SIG, a check PROOF1 of an authenticity or validity of the certificate ZERT can be carried out.

Figure 1:
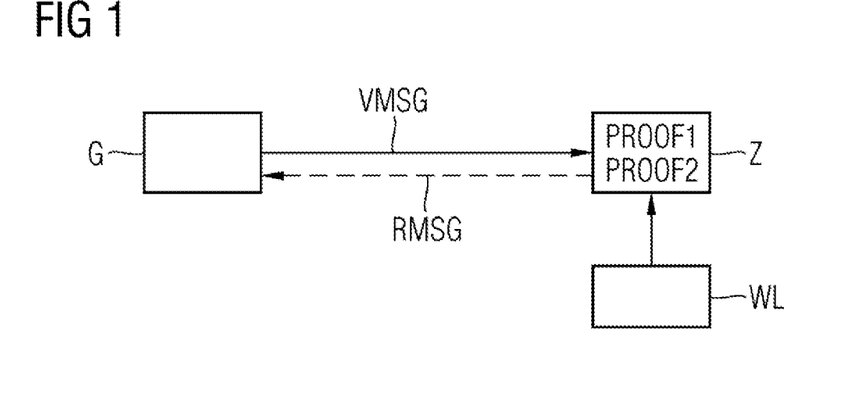
FIG. 1 shows a transmission of a message from a device to a checking unit.
Figure 2:
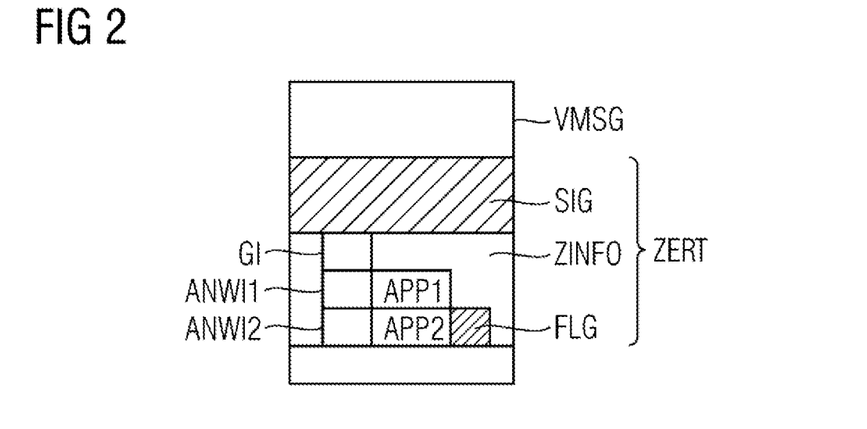
FIG. 2 shows the structure of a message comprising a certificate and an item of permissibility information.

In addition, the pump G supplements the message VMSG with an item of permissibility information ZINFO. The permissibility information ZINFO has the purpose that it is used to inform a checking unit Z that, apart from checking the signature SIG, a determination of a permissibility of the certificate ZERT by means of a positive list WL is to be performed. The permissibility information is preferably contained in the certificate of the pump G. However, it is also possible that the permissibility information is contained in another part of the message VMSG.

The certificate of the pump G can be, for example, a device certificate issued by the manufacturer of the pump, a self-signed certificate of the pump G, or a certificate which has been issued for the pump by the operator of the waste water purification plant and configured on the pump G before its installation. It is also possible that on commissioning of the pump G, the pump first creates a certificate request message and sends it out in order to request a certificate for the pump G which is valid in the waste water purification plant. A certificate server of the waste water purification plant can thereupon provide a certificate, which comprises an item of permissibility information, for the pump G. This can be used thereupon, as described above, by the pump G for the communication with the checking unit Z.

FIG. 2 shows the message VSMG by way of example. It has the signature SIG and one or more notes for the permissibility information ZINFO. In the first exemplary embodiment, the permissibility information only exhibits a flag signal FLG, the flag signal FLG indicating that the certificate ZERT, apart from the checking, should also be tested by means of the determination PROOF2 of the permissibility of the certificate ZERT by means of the positive list WL.

The positive list WL, also known as white list, represents a compilation of one or more entries, wherein a respective entry can be designed for a specific certificate. In general, the determination of the permissibility of the certificate by means of the positive list means that it is checked whether it is the certificate itself or a derived item of information of the certificate or an item of information which can be allocated to the certificate which is present in the positive list or not. If no entry for the certificate to be checked can be found in the positive list, the determination is negative, otherwise it is positive. The positive list WL can be provided for the checking unit Z by a higher-level entity and comprises in the present example a list of certificates of devices which can only be verified positively at all in the industrial plant, i.e. in this special environment.

In the present first exemplary embodiment, the signature SIG of the certificate ZERT is checked as positive by means of the check PROOF1 for authenticity of the certificate ZERT. The determination PROOF2 of the permissibility of the certificate by means of the positive list WL shows that the certificate ZERT is deposited in the positive list WL and that the second check PROOF2 is also positive. Since both the first check PROOF1 and the second check PROOF2 are positive, the pump G is released for use in the industrial plant. The pump G is subsequently informed of this by means of a response message RMSG. Thus, the pump G is authorized for applying a first category K1 to applications. Thus, the pump can receive, e.g. from a control computer, control data in manipulation-protected manner, e.g. control commands for activating or deactivating the pump. In another example, the pump can provide, e.g., diagnostic data to a diagnostics server of the waste water purification plant in protected manner.

Figure 3:
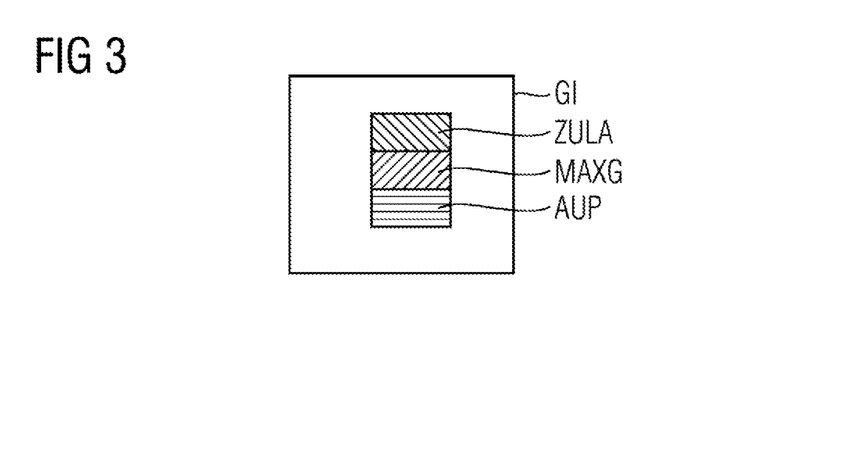
FIG. 3 shows validity information as part of the permissibility information of the message.

Apart from the possibility of informing the checking unit Z by means of the flag signal FLG that both a check PROOF1 and a determination PROOF2 have to be performed, the checking unit Z can also be accompanied by validity information GI which prompts the checking unit Z to a verification of the validity of the positive list WL as part of the determination, see FIG. 3. For this purpose, the validity information GI can have, for example, one or more of the following parameters:

Permissible Issuer(s) ZULA of the Positive List WL:

This indicates that in the determination of the permissibility of the certificate ZERT, only those positive lists WL may be used which have been generated by one or more issuers defined as permissible by the validity information, for example the certificate of the pump must be listed on a positive list of the Siemens company or on a positive list of the operator of the waste water purification plant.

Maximum Permissible Age MAXG of the Positive List WL:

This determines how old the positive list WL forming the basis for the determination PROOF2 is. For example, the maximum permissible age MAXG indicates a period of five weeks. One of a number of possible positive lists to be utilized for determination of the permissibility was already generated six weeks ago. This positive list is, therefore, no longer used as part of the determination since it is older than five months.

Application Environment Parameter AUP of the Positive List WL:

In this context, the message VMSG can indicate an item of information about the location of use or the environment of the device G. For example, an IP address of a particular domain was assigned to the pump G after connection to the power system, e.g. 192.168.180.x. The application environment parameter AUP is set to 192.168.180.x. By means of the checking unit Z, it is checked during the selection of one or more positive lists WL for the determination of permissibility whether the respective positive list is permitted for the respective application environment parameter AUP. For example, a first positive list is only permitted for an application environment parameter of 168.180.180.x and a second positive list is permitted for an application environment parameter 168.178.180.x. Thus, only the second positive list is used for testing the permissibility by the determination of permissibility. In general, the application environment parameter AUP describes one or more specific characteristics which describe a location of use of the device, of the pump G in the present case, in greater detail. Apart from the IP address, this can also be temperature, air humidity, specific characteristics of further devices surrounding the device such as MAC addresses or IP addresses, or also information from radio data such as identification features of a wireless WLAN (WLAN Wireless Local Area Network), network or a GPS-based site information (GPS—Global Positioning System).

In an extension of the first exemplary embodiment, a first application information item ANWI1 for performing a first application APP1 of the device G can also be added to the permissibility information ZINFO. This first application information item AUTH1 indicates which application or applications APP1 may be carried out by the device G if both the checking PROOF1 and the determination PROOF2 of the permissibility are positive. For example, the pump may also be operated in a critical area of the industrial plant in this case, e.g. in an area, in which the pump has to pump very hot and very cold media. Thus, it can be indicated with the aid of the specification of the first application APP1 in which areas of the industrial plant the pump may be used. Thus, the permissibility of the certificate for the first application is determined.

In a development of the example, the permissibility information ZINFO can be supplemented by a second application information item ANWI2 for performing one or more second applications APP2. In this context, it is specified which tasks or applications the device is allowed to perform if the check PROOF1 is positive and determination PROOF2 of the permissibility was negative. This means that, although the signature of the certificate is valid, the certificate (or references to the certificate) is not accessible on any valid positive list of the checking unit Z. A possible second application APP2 can be designed in this case in such a manner that the pump G in the industrial plant cannot be used. In another embodiment, only a non-critical task can be transferred to the pump G such as, for example, a use for pumping media in a non-critical temperature range, for example from 10 to 25° C. Furthermore, an embodiment of the second application could be performed in such a manner that the pump, although it is allowed to participate in a communication with one or more adjacent devices and the checking unit, is not allowed to pump a medium itself.

Figure 4:
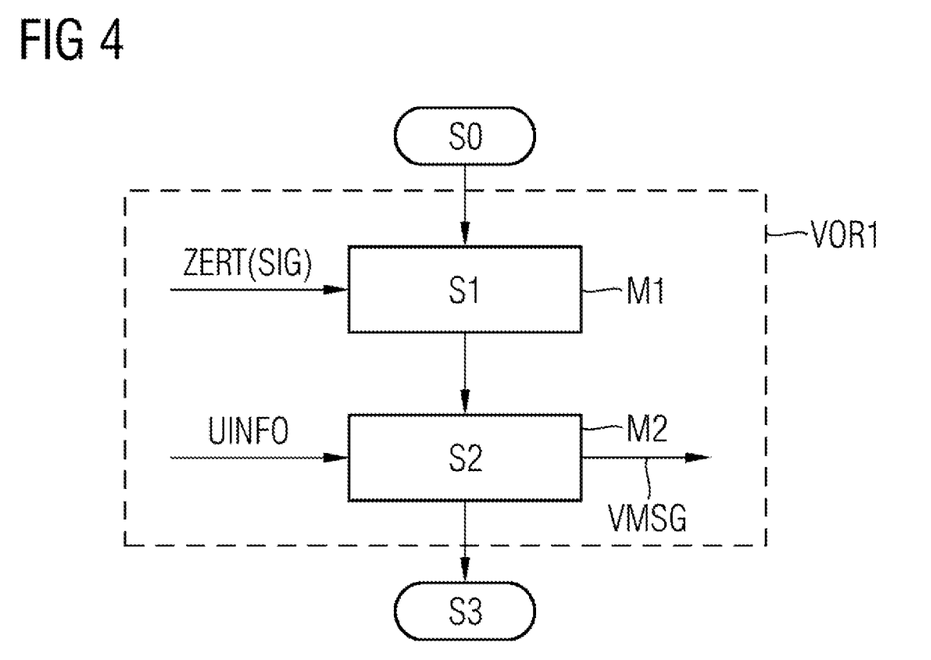
FIG. 4 shows a flow chart and first device for generating the message.

Generating the message VMSG is explained in greater detail by means of FIG. 4. This shows four steps S0, . . . , S3 which represent a flow chart for generation. Furthermore, FIG. 4 also embodies a first device VOR1 with a first unit M1 and a second unit M2 for performing the steps for generating the message.

In a step S0, the flow chart starts.

In a first step S1, implemented by the first unit M1, the certificate comprising at least the signature SIG is generated.

In a second step S2, the permissibility information ZINFO is added to the message VMSG. This second step S2 is carried out by the second unit M2. Adding the permissibility information ZINFO to the message VMSG can be effected, in particular, by adding the certificate which comprises the permissibility information to the message ZINFO.

The flow chart according to FIG. 2 is ended in a third step S3.

Figure 5:
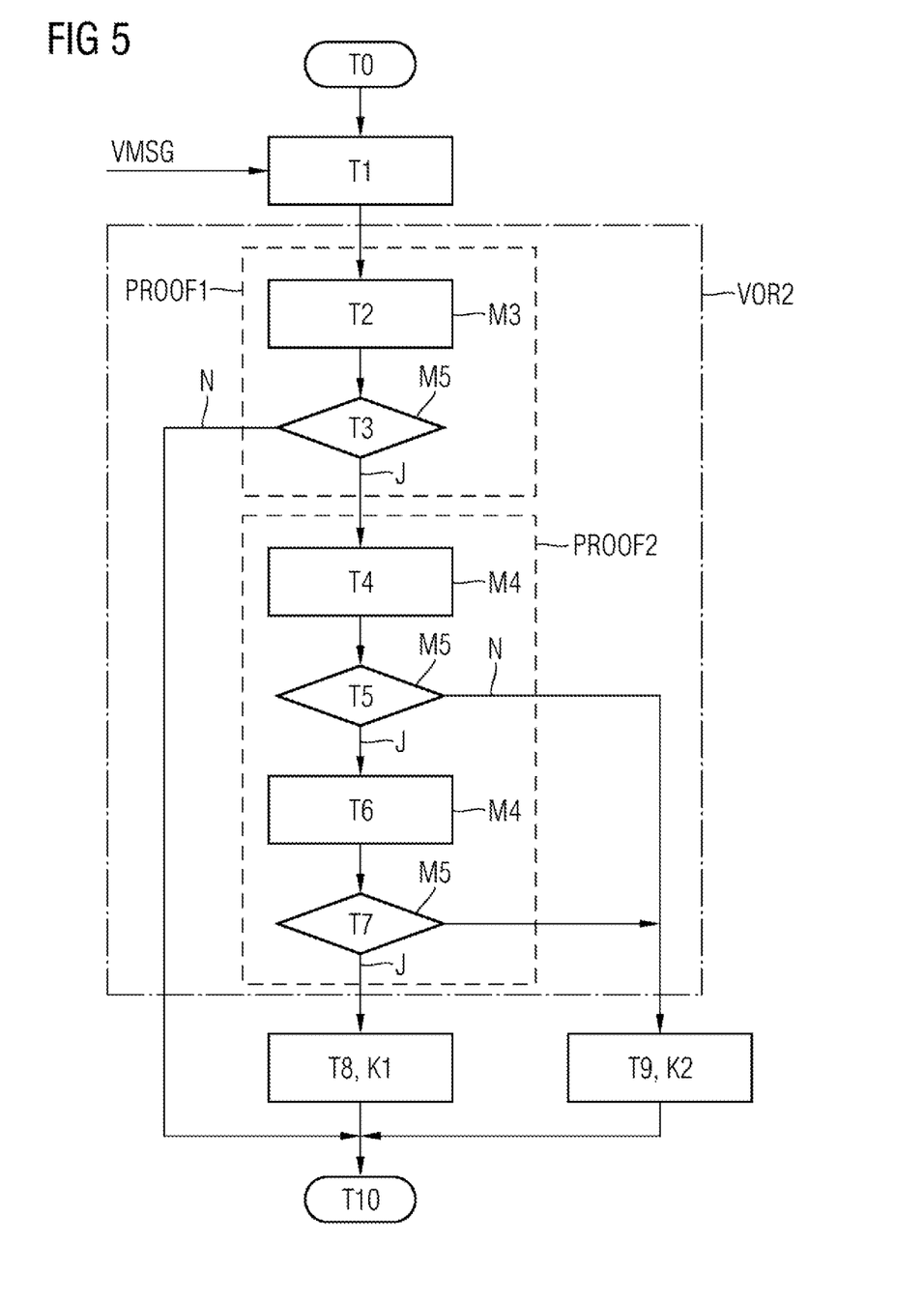
FIG. 5 shows a flow chart and second device for authorizing a device by means of the message.

In a further exemplary embodiment, specific steps for authorizing the pump by means of the message VMSG are to be explained in greater detail with the aid of FIG. 5. FIG. 5 shows, on the one hand, a flow chart with the steps T0 to T10 and also a number of units M3, . . . , M5 for performing the steps. The units embody a second device VOR2.

The flow chart starts in step T0.

In the first step T1, the second device V2 receives the message VMSG. For the representation of FIG. 5, it is assumed that the message VMSG, apart from the certificate, also comprises the permissibility information ZINFO, the permissibility information comprising the validity information GI of the maximum permissible age type MAXG of the positive list WL. Preferably, the permissibility information ZINFO is coded in the certificate. However, it can also be coded as separate information in the message VMSG. In addition, the message VMSG additionally also exhibits the first and second application information items ANWI1, ANW2. The first and the second application information items ANWI1, ANW2 can then be coded in each case in the certificate or they can be coded as separate information in the message VMSG.

In a subsequent second step T2, the check PROOF1 of the authenticity of the certificate is performed with the aid of the signature SIG of the certificate ZERT. A third unit M3 implements the second step T2 and a fifth unit M5 implements the third step T3.

In a third step T3, it is checked whether the check PROOF1 is positive or negative. If it is negative, the third step T3 on path N is left and subsequently a tenth step T10 is carried out. If the check PROOF1 was positive, the third step T3 is left via the path J and subsequently a fourth step T4 is carried out.

In the fourth step T4, the validity information, represented by the maximum permissible age MAXG, is first used for selecting the positive list WL present for the determination of the permissibility. If no positive lists WL which fulfill the validity information GI in this respect are at hand for the checking unit Z, a first stage of the determination PROOF2 is negative. Otherwise, this first stage is positive.

In the case of a negative result of the first stage, a path N is traveled in a fifth step T5 which ends in a ninth step T9. Otherwise, the fifth step T5 conducts the flow chart via a path J to a sixth step T6.

In a sixth step T6, it is determined as part of a second stage of the determination PROOF2 whether the certificate, or a search value derived therefrom, can be found in the positive list WL. If there is an entry for the certificate or the derived search value in the positive list which relates to the certificate, the second stage of the determination is positive in the sixth step T6. Otherwise, the second stage is negative in the sixth step T6.

In a subsequent seventh step T7, the second stage of the determination of the sixth step T6 is analyzed. If this is negative, the seventh step is left via the path N and the flow chart continued in the ninth step T9. Otherwise, the flow chart leads via the path J from the seventh step to the eighth step T8.

In a further embodiment of the invention, the message VMSG can be structured in such a manner that only the permissibility information ZINFO is formed in the form of a flag signal FLG, i.e. there is no validity information GI in the message VMSG. In this case, the determination PROOF2 of the permissibility is only implemented by steps T6, T7. The fourth and fifth steps T4, T5 are skipped in this process. A fourth unit implements the fourth and sixth step T4, T6, respectively, and the fifth unit M5 implements the fifth and seventh step T6, F7, respectively.

The flow chart is located in an eighth step T8 if both the check PROOF1 for authenticity of the certificate and the determination PROOF2 with respect to a permissibility of the certificate by means of the positive list WL is in each case positive. In this case, the device, i.e. the pump G, is authorized in the eighth step T8 to perform a first category K1 of applications such as, for example, of the first application APP1. After conclusion of the application of the first category K1 of applications, the eighth step is terminated by calling up the last step T10. The first category of applications can, but does not have to be, defined by the first application information item. Thus, it can be specified by default that the first category of applications represents a release of the device for operation.

In the ninth step T9, the flow chart indicates that the check for authenticity of the certificate was positive. However, the determination of the permissibility of the certificate by means of the positive list is negative in this ninth step T9. Thus, in the ninth step, the pump can be authorized for a second category K2 of applications. The second category of applications can be designed, for example, by the fact that no applications may be carried out and the pump is not permitted for use in the industrial plant. Alternatively, a second application APP2 which, for example, is not security-critical, can be carried out by the pump in the ninth step T9. After conclusion of the ninth step T9, the flow chart is continued in the tenth step T10.

In the tenth step T10, the flow chart of FIG. 5 is terminated.

The determination PROOF2 with respect to the permissibility of the certificate can be performed by means of at least one of the following execution parameters APA of the certificate and of the positive list:

Serial number of the certificate: by means of the serial number of the certificate which is contained in the message VMSG, the checking unit Z can locate the certificate in the positive list WL.

Issuer of the certificate: the checking unit Z can carry out performing the second check also in dependence on the issuer of the certificate. If, for example, an issuer of the certificate is not listed in the positive list, the second check PROOF2 is negative.

Fingerprint of the certificate: fingerprint of the certificate is understood to mean that it is not the certificate per se but the certificate in a coded form, e.g. in hash coding, which is used for performing the determination of the permissibility. Thus, the hash value of the certificate can be obtained from the certificate of the message VMSG by the checking unit. Following this, the hash value is used for identifying an identically sounding hash value in the positive list. If the identically sounding hash value is not found, the determination is negative, otherwise it is positive.

Fingerprint of the public key in the signature: the procedure for this is analogous to the item "Fingerprint of the certificate", only the public key of the signature being used for the determination instead of the entire certificate.

Copy of the certificate: the procedure is analogous to "Fingerprint of the certificate", wherein, instead of a coded form of the certificate, the certificate can be used in plain text in this variant of embodiments of the invention. Thus, the certificate in plain text represents the index which is to be sought in the positive list.

In a development of embodiments of the invention the message can also exhibit one of the aforementioned execution parameters APA. This informs the checking unit which one of the parameters is to be used for locating the certificate in the positive list.

Figure 6:
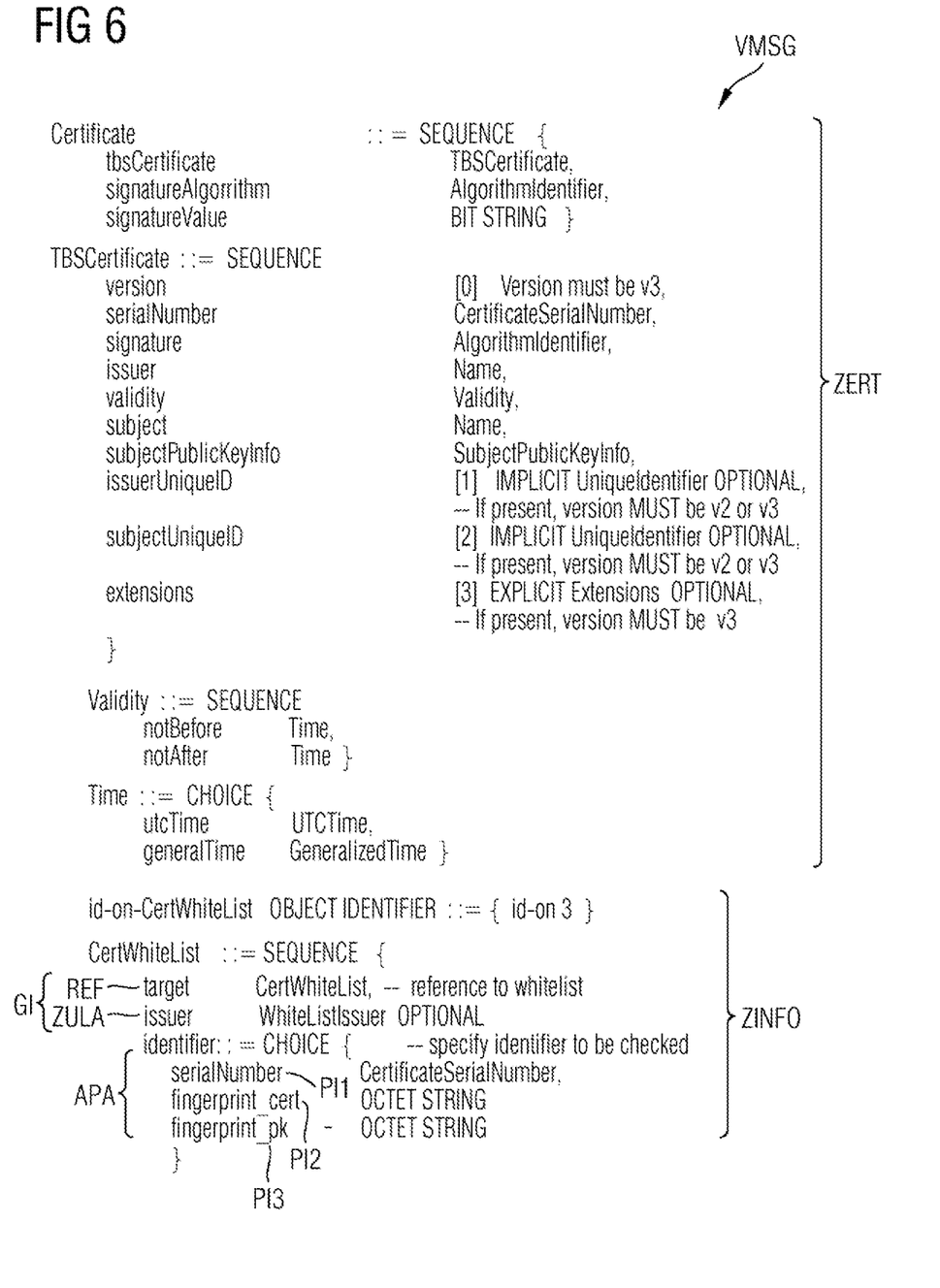
FIG. 6 shows a certificate coded in accordance with the ASN.1 Standard.

FIG. 6 shows a message with the certificate ZERT and the permissibility information ZINFO. The example according to FIG. 6 represents the coding according to x.509 by means ASN.1 coding (ASN.1=Abstract Syntax Notation One) for a so-called identity certificate. The message according to FIG. 6 is subdivided into the certificate area ZERT and into the area describing the permissibility information ZINFO. The permissibility information ZINFO also describes the indication of validity information GI of positive list REF to be used and permissible issuer ZULA of the positive list and execution parameters APA for performing the determination of the permissibility PROOF2. It is a special feature with regard to the execution parameters APA that the checking unit Z is accompanied by three options for performing the determination. Thus, the checking unit Z can perform the second check by means of the serial number, the fingerprint of the certificate or of the fingerprint of the public key. Instead of using an identity certificate, embodiments of the invention can also be used for an attribute certificate. In this context, the procedure is analogous to the representation in FIG. 6.

A first device for generating the message is implemented by the first and second unit. The first and second unit, thus represent the checking unit Z. The second device for authorizing the device is implemented by the third, fourth and fifth unit means.

The units shown in the description can be implemented in software, hardware or in a combination of software and hardware. In this context, individual steps of embodiments of the invention can be deposited in a machine-readable form in a memory, the memory being connected to a processor in such a manner that the processor can read out and process the machine-readable commands. Furthermore, the input and output interfaces for exchanging data to the processor or from the processor can be coupled with the processor.

The invention and its developments have been explained by means of a number of examples. The invention is not restricted to these special exemplary embodiments. In addition, the exemplary embodiments and the developments can be combined in any way and manner.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for generating an authorization request message for a device, comprising:
   providing a certificate of the device, wherein the certificate comprises a signature used for verifying the authenticity of the certificate,
   adding an item of permissibility information to the certificate of the device, wherein the item of permissibility information requires that the certificate of the device be checked against a positive list;
   wherein an application information item is added to the permissibility information, wherein the application information item indicates the device is authorized to perform a low security application in the case of a positive authorization of the device on the basis of a positive check of the authenticity of the signature and of a negative check of the certificate against the positive list,
   further wherein an additional application information item is added to the permissibility information, wherein the additional application information item indicates the device is authorized to perform a security-critical application in the case of a positive authorization of the device on the basis of a positive check of the authenticity of the signature and of a positive check of the certificate against the positive list.

2. The method as claimed in claim 1, wherein an item of validity information is added to the permissibility information, the validity information having at least one of the following parameters which characterizes the positive list to be used in the determination of the permissibility:
   permissible issuer of the positive list;
   maximum permissible age of the positive list;
   application environment parameter of the positive list,
   reference of the positive list to be used.

3. The method as claimed in claim 1, wherein at least one of the following execution parameters is added to the permissibility information, wherein the respective execution parameter describes by means of which characteristic of the certificate the determination can be performed:
   serial number of the certificate;
   issuer of the certificate;
   fingerprint of the certificate;
   fingerprint of the public key;
   copy of the certificate.

4. The method as claimed in claim 1, further comprising:
   sending the authorization request message; and
   receiving a response message, wherein the response message indicates whether the check of the authenticity of the signature was positive and whether the check of the certificate against the positive list was positive.

5. The method as claimed in claim 4, wherein the response message authorizes the device to perform the low security application in the case of a positive check of the authenticity of the signature and of a negative check of the certificate against the positive list, and wherein the response message authorizes the device to perform the security-critical application in the case of a positive check of the authenticity of the signature and of a positive check of the certificate against the positive list.

6. The method as claimed in claim 5, wherein the device performs the low security application in the case of a positive check of the authenticity of the signature and of a negative check of the certificate against the positive list and wherein the device performs the security-critical application in the case of a positive check of the authenticity of the signature and of a positive check of the certificate against the positive list.

7. A computer system, comprising:
   a first device comprising a processor, a memory coupled to the processor, wherein the memory contains program code executable by the processor to implement a method for generating an authorization request message, the method comprising:
      inserting a certificate of the first device into the authorization request message, the certificate including a signature for verifying an authenticity of the certificate, and
      adding an item of permissibility information for determining a permissibility of the certificate by checking the certificate against a positive list;
   wherein the first device is authorized to perform only non-critical operations if, upon review of the authorization request message, it is determined that the authenticity of the certificate is verified but the certificate is not positively checked against the positive list, and
   wherein the first device is authorized to perform both non-critical and critical operations if, upon review of the authorization request message, it is determined that the authenticity of the certificate is verified and the certificate is positively checked against the positive list.

8. The computer system as claimed in claim 7, wherein the permissibility information can be extended such that an item of validity information is added to the permissibility information, the validity information having at least one of the following parameters which characterizes the positive list to be used in the determination of the permissibility:
   permissible issuer of the positive list;
   maximum permissible age of the positive list;
   application environment parameter of the positive list,
   reference of the positive list to be used.

9. The computer system of claim 7, wherein a second device authorizes the first device using the authorization request message by
   checking the authenticity of the certificate of the authorization request message, determining the permissibility of the certificate by checking the certificate against the positive list.

10. The computer system as claimed in claim 9, wherein an item of validity information is added to the permissibility information, the validity information having at least one of the following parameters which characterizes the positive list to be used in the determination of the permissibility:
- permissible issuer of the positive list;
- maximum permissible age of the positive list;
- application environment parameter of the positive list,
- reference of the positive list to be used.

11. A method for requesting authorization of a first device based on an authorization request message, wherein the authorization request message comprises a certificate of the first device and the certificate of the first device comprises a signature for verifying an authenticity of the certificate of the first device, the method for requesting authorization of the first device comprising:
- adding, by the first device, permissibility information to the authorization request message, wherein the permissibility information indicates that both verifying of the authenticity based on the signature and determining a permissibility of the certificate of the first device based on a positive list must be performed, and
- transmitting the authorization request message with the added permissibility information to a second device,
- wherein the second device authorizes the first device based on the transmitted authorization request message and permissibility information, wherein the first device is authorized to execute a first category of at least one application, if both the verifying of the authenticity based on the signature and the determining the permissibility of the certificate of the device based on the positive list are performed positively.

12. The method as claimed in claim 11, wherein an item of validity information is added to the permissibility information, the validity information having at least one of the following parameters which characterizes the positive list to be used in the determination of the permissibility of the certificate of the first device:
- a permissible issuer of the positive list;
- a maximum permissible age of the positive list;
- an application environment parameter of the positive list; and
- a reference of the positive list to be used.

13. The method as claimed in claim 11, wherein a first application information item for performing a first application of the first device is added to the permissibility information, wherein the first application information item can be applied when both the verifying of the authenticity based on the signature and the determining the permissibility of the certificate of the first device based on the positive list are performed positively.

14. The method as claimed in claim 11, wherein a second application information item for performing a second application of the first device is added to the permissibility information, wherein the second application information can be applied when the verifying of the authenticity based on the signature is performed positively but the determining the permissibility of the certificate of the first device based on the positive list is performed negatively.

15. The method as claimed in claim 11, wherein at least one of the following execution parameters is added to the permissibility information, wherein the respective execution parameter describes by means of which characteristic of the certificate the determination can be performed:
- a serial number of the certificate;
- an issuer of the certificate;
- a fingerprint of the certificate;
- a fingerprint of the public key; and
- a copy of the certificate.

16. The method as claimed in claim 11, further comprising:
- authorizing the first device to execute a second category of the at least one application, if the verifying of the authenticity based on the signature is performed positively but the determining the permissibility of the certificate of the first device based on the positive list is performed negatively.

17. The method as claimed in claim 11, wherein the permissibility information is separate from the certificate of the first device.

18. The method as claimed in claim 11, wherein the permissibility information is a part of the certificate of the first device.

* * * * *